(12) United States Patent
Pardoen

(10) Patent No.: US 7,598,843 B2
(45) Date of Patent: Oct. 6, 2009

(54) VERY HIGH FREQUENCY TRANSPONDER, IN PARTICULAR A UHF TRANSPONDER, INCLUDING A PROTECTION AGAINST ELECTROSTATIC DISCHARGES

(75) Inventor: Matthijs Pardoen, Le Landeron (CH)

(73) Assignee: EM Microelectronic-Marin SA, Marin (CH)

( * ) Notice: Subject to any disclaimer, the term of this patent is extended or adjusted under 35 U.S.C. 154(b) by 653 days.

(21) Appl. No.: 11/300,347

(22) Filed: Dec. 15, 2005

(65) Prior Publication Data

US 2006/0132221 A1    Jun. 22, 2006

(30) Foreign Application Priority Data

Dec. 16, 2004    (EP) .................................. 04029823

(51) Int. Cl.
*H04Q 5/22* (2006.01)
(52) U.S. Cl. .................. 340/10.1; 340/10.4; 340/572.1; 340/572.2; 340/572.4; 340/662; 340/657; 361/56; 361/57; 361/111
(58) Field of Classification Search .............. 340/10.34, 340/10.1, 10.4, 572.1, 572.2, 572.4, 662, 340/657; 361/56, 57, 111
See application file for complete search history.

(56) References Cited

U.S. PATENT DOCUMENTS

| 5,345,231 | A | * | 9/1994 | Koo et al. ............... 340/870.31 |
| 5,815,355 | A | | 9/1998 | Dawes |
| 6,549,064 | B2 | | 4/2003 | Bandy et al. |
| 7,460,345 | B2 | * | 12/2008 | Brandl ........................ 361/56 |

FOREIGN PATENT DOCUMENTS

| GB | 2 330 957 A | 5/1999 |
| WO | WO 96/38805 | 12/1996 |
| WO | WO 02/27650 A1 | 4/2002 |
| WO | WO 2004/107077 A1 | 12/2004 |

OTHER PUBLICATIONS

European Search Report in corresponding European patent application No. EP 04 02 9823, completed Jan. 25, 2005.

* cited by examiner

*Primary Examiner*—Vernal U Brown
(74) *Attorney, Agent, or Firm*—Griffin & Szipl, P.C.

(57) ABSTRACT

The UHF transponder includes protection against electrostatic discharge (ESD) formed by the modulation transistor (T1) and additional control means (20) for said transistor which fulfils two functions: its first response signal modulation function and an additional ESD protection function.

2 Claims, 1 Drawing Sheet

VERY HIGH FREQUENCY TRANSPONDER, IN PARTICULAR A UHF TRANSPONDER, INCLUDING A PROTECTION AGAINST ELECTROSTATIC DISCHARGES

This application claims priority from European Patent Application No. 04029823.4 filed Dec. 16, 2004, the entire disclosure of which is incorporated herein by reference.

FIELD OF THE INVENTION

The present invention concerns very high frequency transponders, in particular passive transponders operating in the UHF range. As shown in FIG. 1, transponders 2 of this type generally comprise an open antenna 4 connected to two terminals A and B of an integrated circuit by a rectifier circuit 6 at input and by a circuit 8 located downstream of the supply capacitor C1 of circuit 6. Circuit 8 comprises in particular the transponder logic circuit and a modulation transistor controlled by the logic circuit to generate response signals by modulation of the electromagnetic field provided by a reader.

BACKGROUND OF THE INVENTION

Rectifier 6 of UHF transponder 2 of FIG. 1 is formed by two diodes D1 and D2 and by capacitor C1. Diode D1 is arranged in parallel with diode D2 and capacitor C1 between the input terminals A and B of the integrated circuit. This type of rectifier, in the case of a UHF transponder, allows capacitor C1 to be charged at a voltage close to that defined by the electromagnetic signal received between its two peak values.

If terminal A is defined as the positive terminal and terminal B as the negative terminals, a positive current thus flows in the integrated circuit between terminal A and terminal B. This definition will be maintained hereinafter.

Transponder 2, shown in FIG. 1, has a problem of protection against electrostatic discharge (ESD), more particularly in the case where the discharge current is positive ($V_A > V_B$). In fact, in the case of a negative current, diode D1 is conductive such that the current can flow through the diode up to a relatively high value without any damage due to the dissipation of energy, even if diode D1 is of small dimensions. However, in the case of a positive current, when there is electrostatic discharge, diode D1 blocks the passage of the current to its breakdown voltage, for example between 5 V and 10 V in absolute value. Two problems occur in this latter case. First of all, the strong discharge current often destroys circuit 8 before diode D1 allows the current to pass. Then, if the diode is of small dimensions, it cannot absorb power corresponding to the discharge current multiplied by the breakdown current of the diode. Consequently, the transponder is generally destroyed by a positive electrostatic discharge.

In order to obtain an efficient rectifier, diodes D1 and D2 are preferably small Shottky diodes. In order to resolve the aforementioned problem, the transponder 10 shown in FIG. 2 has been proposed, wherein a diode D3 is arranged in parallel with diode D1. This diode D3 has relatively small dimensions with low impedance. Diode D3 has little influence on the rectifier circuit and it is provided with a lower breakdown voltage than that of diode D1, preferably close to the operating voltage of the integrated circuit but higher than the latter.

Transponder 10 has, however, drawbacks. First of all the ESD protection is relatively low since it is difficult to define the breakdown voltage of diode D3 precisely, this voltage being dependent on the integrated circuit manufacturing technology. Another major drawback arises from the fact that diode D3 significantly increases the input capacitance of the integrated circuit, which increases the energy dissipated by the circuit and decreases the voltage at the terminals of supply capacitor C1. The negative consequence of this is a decrease in the communication distance to a given reader.

It is an object of the present invention to propose a transponder of the type described hereinbefore provided with protection against electrostatic discharge (ESD) which does not have the aforementioned drawbacks.

SUMMARY OF THE INVENTION

Thus, the present invention concerns a transponder of the aforementioned type wherein the ESD protection means are formed by the modulation transistor and by additional control means for the transistor arranged to set it in its conductive state when an electrostatic discharge current leaves the rectifier circuit in the direction of the logic circuit.

Thus, the modulation transistor has two distinct functions, namely its first reader response signal modulation function and a second transponder ESD protection function. In order to provide this ESD protection efficiently, it is necessary to have a transistor with relatively large characteristic dimensions. In order to perform its first modulation function, the modulation transistor generally has such dimensions. The invention results in good ESD protection for the transponder without needing to arrange an additional element of relatively large dimensions. Moreover, this solution enables good ESD protection to be obtained without increasing the input capacitor of the transponders integrated circuit.

BRIEF DESCRIPTION OF THE DRAWINGS

The present invention is described with reference to the annexed drawing, in which.

DETAILED DESCRIPTION OF THE ILLUSTRATIVE EMBODIMENTS

The invention will thus be described hereinafter in a detailed and non-limiting manner with reference to FIG. 3.

Figure 1:
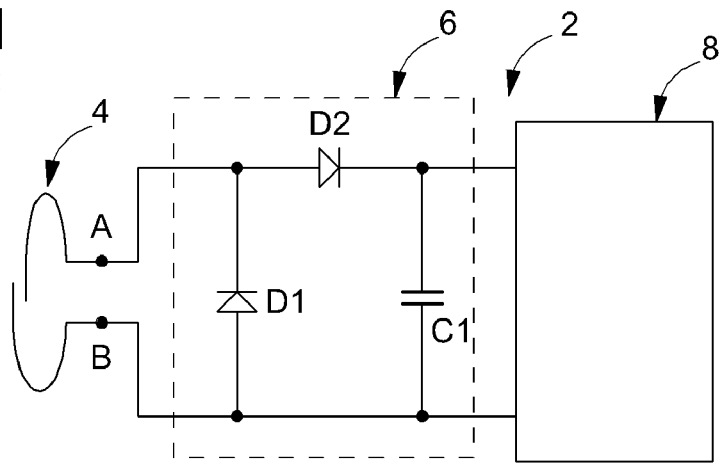
FIG. 1, already described, schematically shows a UHF transponder with its rectifier circuit, FIG. 2, already described, shows a transponder of the type of FIG. 1 provided with an additional ESD protection diode.
Figure 2:
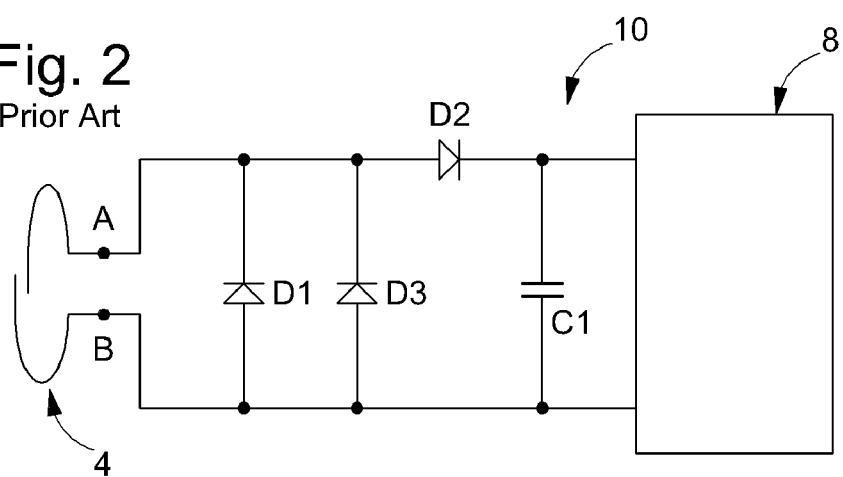
Figure 3:
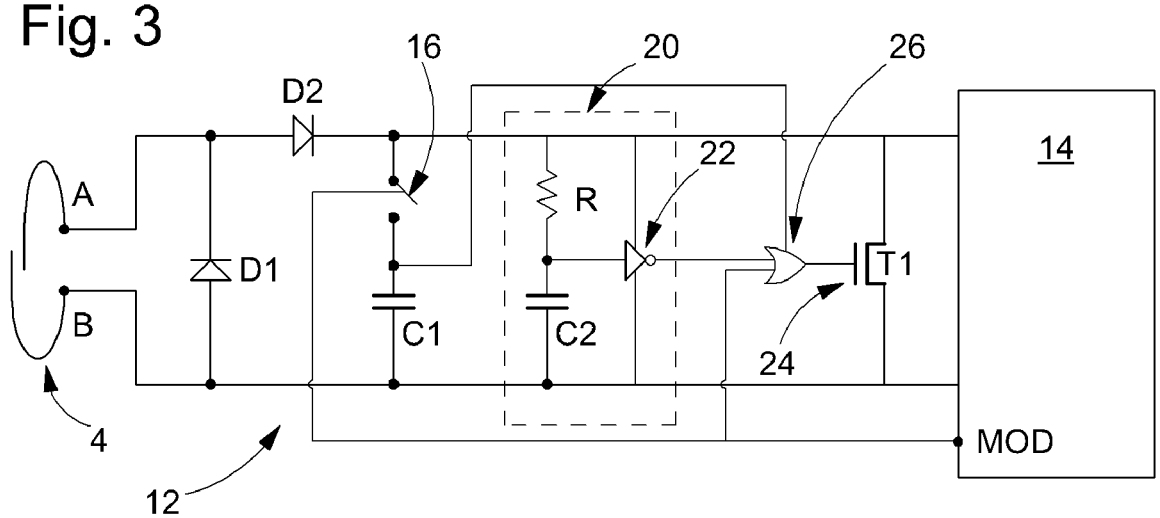
FIG. 3 shows schematically an embodiment of the present invention.

Transponder 12 of FIG. 3 comprises an open antenna 4 and a rectifier circuit formed of two diodes D1 and D2 and a supply capacitor C1. It will be noted that the rectifier can have a different arrangement and particularly further comprise a voltage booster. This transponder comprises a modulation transistor T1 controlled by logic circuit 14. In a conventional manner, in parallel to the control of transistor T1, circuit 14 also controls a switch 16 arranged in series with capacitor C1 between diode D2 and input terminal B.

According to the invention, transponder 12 comprises additional control means 20 for modulation transistor T1 also provided for ESD protection in the event of a positive electrostatic discharge. These control means 20 are arranged between the rectifier circuit and transistor T1. In a non-limiting manner, control means 20 are formed by a resistor R arranged in series with a capacitor C2, located on the side of terminal B, and by an inverter 22 whose input is connected between resistor R and capacitor C2. The output of this inverter is connected to the control terminal 24 of transistor T1 via a logic "OR" gate 26. The second input of the logic gate is connected to the modulation control means, arranged in logic circuit 14, which send a signal MOD to activate transistor T1 via logic gate 26.

It will be noted that the presence of inverter 22 is connected, in particular, to the NMOS implementation technology of transistor T1. When control terminal 24 receives a low voltage signal, transistor T1 is non-conductive, whereas it becomes conductive when the voltage signal is high.

During normal operation, capacitors C1 and C2 are charged and only a low current passes through resistor R such that the function point between this resistor and capacitor C2 has a high voltage. Inverter 22 then sends a low voltage signal to transistor T1, which is thus non-conductive in the absence of a high voltage signal originating from logic circuit 14. However, in the case of a positive electrostatic discharge, a strong electric current passes through resistor R. This results in a potential drop at the terminals of the resistor and reverser 22 thus sends a high voltage signal. Transistor T1 is made conductive and the discharge current can then flow through the transistor without damaging the integrated circuit.

Those skilled in the art will know how to determine suitable values for R and C2 so as to efficiently carry out the aforementioned control of transistor T1.

It will be noted finally that transistor T1 is particularly well suited to ESD protection given its relatively large characteristic dimensions and its parallel arrangement between the rectifier circuit and logic circuit 14 that requires protection.

What is claimed is:

1. A transponder including an antenna, a rectifier circuit, a logic circuit powered by said rectifier circuit and a modulation transistor arranged between said rectifier circuit and said logic circuit, said modulation transistor being controlled by said logic circuit to form transponder response signals, wherein it includes electrostatic discharge protection means formed by said modulation transistor and by additional means for controlling said modulation transistor arranged to put it in its non-conductive state when an electrostatic discharge leaves said rectifier circuit in the direction of said logic circuit.

2. The transponder according to claim 1, wherein said additional control means are arranged between said rectifier circuit and said modulation transistor, a logic "OR" gate being arranged between said additional control means and the control terminal of said modulation transistor, the additional control means sending a first control signal to a first input of said logic "OR" gate and said logic circuit being connected to said second input of said logic gate to which it provides a second control signal to modulate said response signals.

* * * * *